(12) United States Patent
Abbas

(10) Patent No.: US 9,171,255 B2
(45) Date of Patent: Oct. 27, 2015

(54) METHOD, SOFTWARE, AND SYSTEM FOR MAKING A DECISION

(71) Applicant: Ali Abbas, Champaign, IL (US)

(72) Inventor: Ali Abbas, Champaign, IL (US)

(73) Assignee: Ali Abbas, Los Angeles, CA (US)

( * ) Notice: Subject to any disclaimer, the term of this patent is extended or adjusted under 35 U.S.C. 154(b) by 176 days.

(21) Appl. No.: 13/936,126

(22) Filed: Jul. 5, 2013

(65) Prior Publication Data

US 2014/0019389 A1 Jan. 16, 2014

Related U.S. Application Data

(60) Provisional application No. 61/669,799, filed on Jul. 10, 2012, provisional application No. 61/838,210, filed on Jun. 21, 2013.

(51) Int. Cl.
*G06F 15/18* (2006.01)
*G06N 5/02* (2006.01)
*G06N 99/00* (2010.01)
*G06N 5/04* (2006.01)

(52) U.S. Cl.
CPC .. *G06N 5/02* (2013.01); *G06N 5/04* (2013.01); *G06N 5/041* (2013.01); *G06N 99/005* (2013.01)

(58) Field of Classification Search
None
See application file for complete search history.

(56) References Cited

U.S. PATENT DOCUMENTS

| | | |
|---|---|---|
| 5,774,121 A | 6/1998 | Stiegler |
| 7,593,910 B1 | 9/2009 | Owen et al. |
| 7,974,872 B2 | 7/2011 | Katayama et al. |
| 8,032,481 B2 | 10/2011 | Pinckney et al. |
| 8,234,231 B2 | 7/2012 | Kelly |
| 2003/0069868 A1 | 4/2003 | Vos |
| 2005/0049986 A1* | 3/2005 | Bollacker et al. ............... 706/46 |
| 2009/0292677 A1* | 11/2009 | Kim .................................. 707/3 |
| 2010/0198757 A1* | 8/2010 | Cheng et al. .................... 706/12 |
| 2010/0306157 A1 | 12/2010 | Onuchin et al. |
| 2012/0265635 A1 | 10/2012 | Forsblom |

OTHER PUBLICATIONS

Wang, Huaiqing. "Intelligent Agent-Assisted Decision Support Systems: Integration of Knowledge Discovery, Knowledge Analysis, and Group Decision Support" 1997 [Online] Downloaded Mar. 25, 2015 http://www.sciencedirect.com/science/article/pii/S0957417496001030#.*

* cited by examiner

*Primary Examiner* — Ben Rifkin

(57) ABSTRACT

A method for making a decision includes receiving a first decision question from a first user, providing a database of information regarding elements of decision quality, populating the database with data corresponding to each element of decision quality as applied to the first decision question, and providing a decision recommendation for the first decision question based at least in part on the data.

8 Claims, 7 Drawing Sheets

METHOD, SOFTWARE, AND SYSTEM FOR MAKING A DECISION

REFERENCE TO RELATED APPLICATION

This application claims the benefit of U.S. Provisional Patent Application No. 61/669,799, filed Jul. 10, 2012, entitled "METHOD AND PROCESS FOR DECISION ANALYSIS AND DECISION FRAMING USING A SOCIAL NETWORK," and U.S. Provisional Patent Application No. 61/838,210, filed Jun. 21, 2013, entitled "DECISION ANALYSIS AND DECISION FRAMING USING A SOCIAL NETWORK AND HISTORIC DECISION POSTS."

BACKGROUND OF THE INVENTION

The present invention relates to a decision analysis and decision framing using a social network and historic decision posts.

While the field of decision analysis has advanced significantly in the last few decades, it has not penetrated the daily lives of the general public. Many people are not even aware that decision skills can be taught and improved. The general public relies mainly on their intuition in decision making. Contributing factors to this include but are not limited to:

i. Decision education is mainly conducted through coursework at the university level using hypothetical numerical examples and/or case studies involving large corporations that are removed from peoples' daily lives.

ii. Decision support software has been created for a trained analyst, who knows about decision modeling, and not a general user.

iii. Conducting a decision analysis requires identifying the elements of a decision such as the important alternatives, objectives, uncertainties, and the frame (or bigger picture of the decision). It has been proven that this is a cognitively difficult task when a person is facing a decision.

iv. The average individual lacks probabilistic reasoning skills.

v. Current social media sites, while popular, are not equipped with decision support tools, so the general public is unaware of their existence.

As can be seen, there is a need for solutions to these and other problems.

SUMMARY OF THE INVENTION

The present invention relates to decision analysis and decision framing, and more particularly, to decision making using (i) a social network, (ii) a decision-focused web-crawler, and (iii) a database of historical decisions. The proposed innovation leverages peoples' affinity for social networks and for sharing content on the internet to revolutionize societal decision making by providing elements of decision quality and decision support for the lay person.

One aspect of the invention allows for a new decision process designed for the general public. The present invention addresses two fundamental aspects of decision analysis:

(a) Improving the quality of the inputs needed to analyze a decision using social networks, the user, and a database of historic decisions, polls, stories, and thoughts. These inputs include (i) the alternatives, (ii) uncertainty, (iii) preferences, (iv) frame or bigger picture, (v) pros/cons, and (vi) information. These inputs may be referred to collectively from hereon as the elements of decision quality. This method also includes the new notion of a decision-focused web-crawler that searches the web and the database for elements of decision quality related to a decision and provides personalized recommendations to the user. A method for quantitatively assessing the quality of the inputs received is also proposed.

(b) A process for the analyzing a decision that is tailored to the general public, based on the inputs received for a decision post. This process also includes methods to construct decision trees using semantic text questions posted by a user.

The method according to one aspect of the present invention may provide inputs for a given decision from (i) the user, (ii) a social network, (iii) historic decisions posted by other users, (iv) a decision-focused web crawler that searches the web for the elements of decision quality related to the decision and (v) automated personalized recommendations for all elements of decision quality based on numerous factors that may include the user's history on the site and their geographic location.

The method according to one aspect of the present invention also may provide several algorithms for incorporating these inputs into a framework for making the best decision using decision analysis. New algorithms may be introduced to incorporate the inputs received for a given decision into a decision analysis methodology that is tailored to the general public.

Aspects of the present invention may include these features, and may improve over prior art:

i. None of the existing rational (expected utility) decision analysis methods rely on incorporating (i) using a social network as part of the decision process, (ii) using historic posts from the social network, (ii) using "similar" posts as part of the decision process, and (iv) incorporating these inputs to provide a final recommendation. Some approaches may use a social network to gather votes on pros/cons. However, pros/cons analysis is not the basis for rational expected utility decision making, and does not incorporate uncertainty. Such approaches are arbitrary and can lead to bad decisions. The present invention may incorporate social network inputs as well as historic inputs from the database into pros/cons analysis, weight and rate analysis, multiobjective analysis, and decision tree analysis. Unlike previous approaches to pros/cons analysis, the present approach may not aggregate votes on pros/cons of an alternative to determine its viability. Rather, it may offer a forum for soliciting inputs on all aspects of decision quality including framing, and makes those inputs as well as historic recommendations, available for rigorous decision analysis.

ii. Let Simon Decide™: This site has no social network aspect and it relies on an existing number of predefined decision templates. Users must select from one of the existing templates and fill in a form. Given the wealth of new decisions because of technological advancements (such as purchasing decisions as a mere example), there is a need for general automated decision support sites that go beyond pre-existing templates. This "Let Simon Decide™" system also does not use the expected utility criterion and does not allow uncertainty into the calculation. The use of a preexisting list of alternatives instead of soliciting alternatives through a social network poses a challenge since technology may render some alternatives obsolete and may introduce new decision alternatives that a preexisting list might not include.

iii. Analytic Hierarchy Process (AHP). This system also does not incorporate a social network of users and does not follow the norms of rational decision making; the removal of an alternative may change the rank order of the remaining alternatives. This serious flaw is referred to as rank-reversal.

iv. Social networking sites such as Google™ or Yahoo Answers™ fetch information links and information articles from the internet. But information alone is not sufficient to make a decision. Other elements of decision quality such as the pros/cons, preferences, uncertainty, bigger picture, alternatives, as well as information are needed. Search engines do not take into account personalized preferences (such as risk aversion of the user) or other elements of decision quality when providing results to a user.

v. Facebook™ social search: This tool tells you who on your network liked a restaurant. It does not solicit inputs of decision quality from your friends. A good decision for one person might not be a good decision for another. If your friend liked a restaurant in Chicago, you might be allergic to that particular type of food. Therefore social search mechanisms do not offer personalized recommendations that take into account user preferences and do not necessarily provide recommendations using rational decision making.

vi. Quora™. This site is about information in response to questions, and again, does not take into account all aspects of decision quality, such as preferences. This is why a fundamental part of this invention is making personalized recommendations based on user preferences.

Internet-based approaches to decision making have not used the expected utility criterion as a basis for making the decision using a social network. The use of a social network is essential to help the decision maker think clearly about all aspects of a decision, including media articles and common knowledge that the user might not be aware of. In addition, the social networking aspects helps brainstorm elements of decision quality including alternatives, preferences, uncertainties, and the pros/cons of the decision. The social networking aspect also provides a means for capturing a large database of posts to make them available to users as per the proposed invention. It is quite plausible that a user faces a decision situation that another user has encountered in the past (such as which undergraduate major to declare or which automobile to purchase). It will help the user to get access to the elements of decision quality that a user had received when making a past decision.

None of the existing methods elicit a decision frame using a social network or historic inputs, or elicit the uncertainty using a social network. Existing methods either require the decision maker to come up with all elements of a decision himself when facing a decision, or request that a decision maker choose from a preexisting list that includes only the alternatives and some aspects of the preference objectives alone without considering the uncertainty. Additionally, none of the existing methods request likelihoods or preference orderings of the outcomes in the form of numbers or graphical displays, from the social network, such as a probability wheel or a sliding bar from the social network. Many of the existing methods do not use an expected utility framework such as relying instead on an Analytic Hierarchy Process (AHP).

In the existing online decision making systems, the social networking aspect of adding a decision friend, or having decision friends or other users suggesting to you the frame, alternatives, uncertainties, preferences, likelihood, utility is not present. The proposed invention leverages the idea of a social network to introduce the concept of sharing a decision analysis with friends and/or the public to get feedback about the different inputs you have analyzed. For example, a user may share a decision alternative on a decision tree with its probabilities, consequences and utility values, with another user. The user may edit the values and share it back with the user. Similar types of sharing apply to all other elements of the decision analysis. This portion of an invention enables the general public to get help on their reasoning and on their beliefs and preferences by sharing the analysis on the social network, a feature that never existed in any prior art.

As can be seen, there is a need for a decision making process that can incorporate social networking as well as historic inputs so that a user from the general public or a decision maker can utilize a more holistic approach to making a decision without the need for formal decision analysis training.

In one aspect of the present invention, a method for making a decision comprises: receiving a first decision question from a first user; providing a database of information regarding elements of decision quality; populating the database with data corresponding to each element of decision quality as applied to the first decision question; and providing a decision recommendation for the first decision question based at least in part on the data.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a means for conducting decision analysis and decision framing using any subset of: (i) a social network of users, (ii) inputs from the user, (iii) historic posts, (iv) a decision-focused web crawler, (v) personalized recommendations based on the user history (including numerous factors such as their previous posts, geographic location, age, gender, and race), as well as a communication medium such as the internet.

The method according to one aspect of the present invention can be used a variety of systems including healthcare (to determine the best plan, or best treatment option), investment (to determine the best investment decision), business decisions, college decisions, social security decisions, home purchase, which college to attend, and a variety of other ways.

The method according to one aspect of the present invention can be divided into two steps. The first step is initiated when a user requests help on a decision. The invention solicits inputs to the decision from the user, a social network, historic posts, a new notion of a decision-focused web crawler, as well as personalized automated recommendations made by the system to the user based on his history and previous choices made. The second step provides analysis of the posted decision based on the inputs received.

The method according to one aspect of the present invention may provide a user interface which may run on a server, a mobile electronic device, a personal computer and/or embedded into any website. The method may include steps of generating a database; storing entries, creating a user profile (including things such as a bio, skills, education, friends, and interests), and accessing the database for search of prior decision posts or for decision friends. The method may also include a method for deriving scores for the users based on their posts, skills, education, and feedback provided to other users. The method may also provide a mobile version whereby users can post decisions and respond to decision posts using a mobile device.

Figure 1:
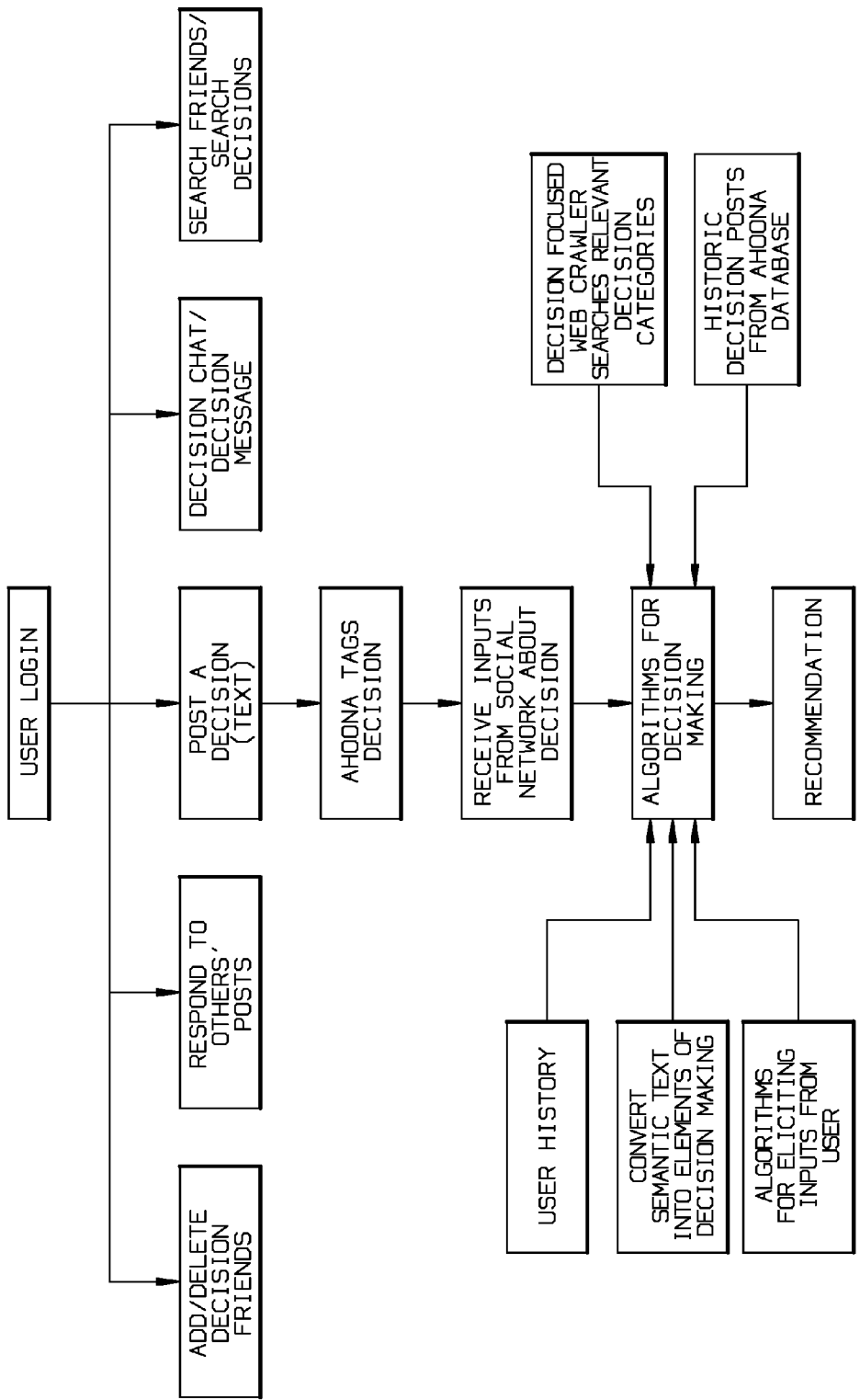
FIG. 1 shows a flowchart illustrating the decision process according to one embodiment of the present invention.
Figure 2:
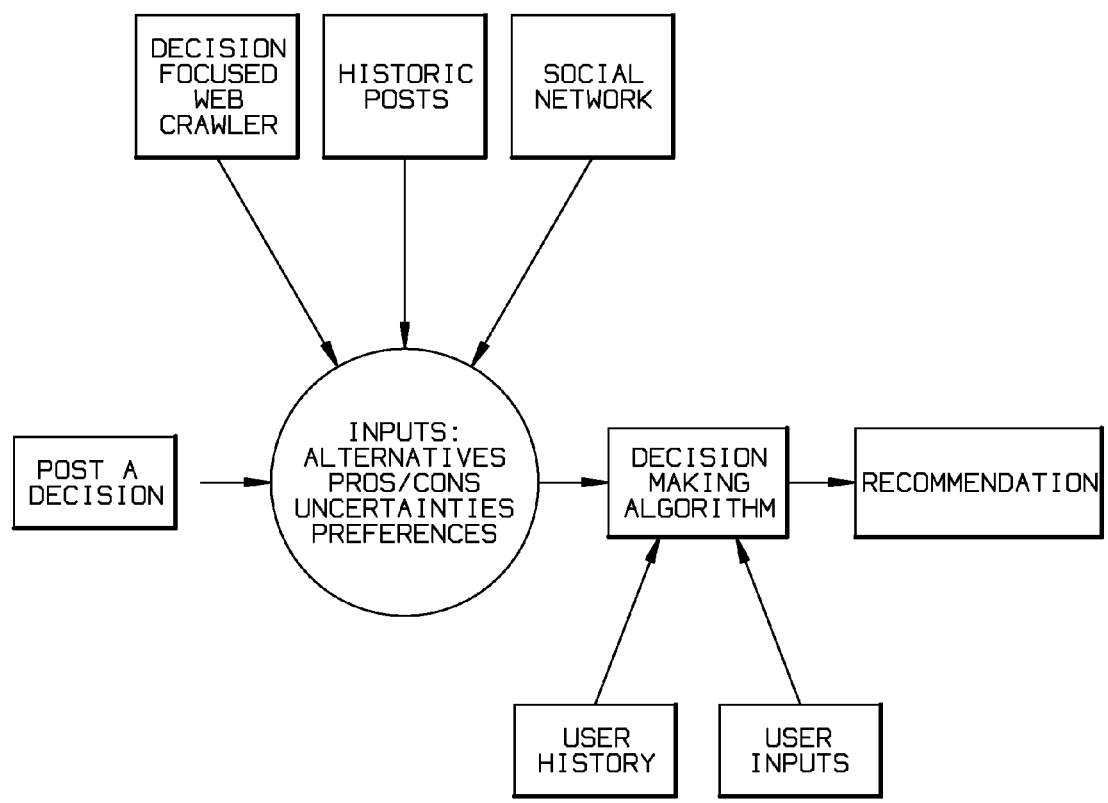
FIG. 2 shows a simplified view of decision process flow chart according to one embodiment of the present invention.

Referring now to FIGS. 1 and 2, which present the basic flow for one embodiment of the present invention, a user visits the website or user interface and creates a profile that includes any subset of: the user's friends on the site, historic posts made by the user, a brief bio, interests, education level, skills, work experience, attitude towards risk, goals in life, personality data, a variety of personal objectives, and other relevant aspects of the social network.

The interface may include a forum for user login/signup; a display of some of the decisions posted previously by users of the network; media articles that are of interest to the user; responses previously made by the social network; as well as a search feature for searching for prior decisions and/or other users on the site. The interface may also include a video explaining how to use the invention, as well as a mechanism for users to message each other or chat in real time. These elements in the user interface can be interchanged and placed after the login if needed. Different users can be presented with different posts based on their interests (as indicated on their profile) or using their history on the site (the posts they have analyzed or browsed or offered help with). The user may post a decision he is facing to members of the social network or a poll or a story about a past decision, or merely a question or a thought. He may also respond to decision posts and or/delete posts and friends. If that user posts a decision, then the decision may be tagged to facilitate its search by members of the network.

When a user posts a decision or a poll or a story or thought, the software/method may solicit inputs to help the user with the decision analysis. The inputs solicited may include the elements of decision quality, such as (i) the set of feasible alternatives from which the user may choose, (ii) the preferences or objectives corresponding to this post, (iii) uncertainties associated with each of the feasible alternatives, (iv) a set of pros and cons for each alternative, (v) information which is in the form of related media articles or citations, and (vi) the frame which includes the bigger context of the decision. The solicited inputs can be obtained in any order and users do not need to provide all of the inputs. Any subset of the solicited inputs can be used in the decision making process.

To illustrate the elements of decision quality, suppose a user posts a decision about which graduate school to go to after receiving some offers. The alternatives would be the set of schools for which he has received offers, as well as alternatives to apply to additional schools. The uncertainties would be anything that is unknown at the moment. For example, uncertainties may include job prospects after graduation. The preferences include the main attributes of interest to the user within the context of this decision. These preferences could include the cost of tuition, quality of education, lifestyle, and placement. Some attributes of interest could also be uncertain at the time. For example job prospects can be attributes of preference but may be uncertain at the time of making the decision.

The information may include any information that is relevant to the decision. For example, information may include articles about the campus life, or cost of tuition or stories about a particular school. Finally, the frame or bigger picture asks the following questions: What are you taking as given? What other decisions should you be considering? What decisions will you be deciding upon later? Within the context of this particular decision, it might be that the user is taking as given the he wants to go to graduate school. This should be challenged and re-thought. Decisions to be decided upon later include where he will live when he goes to graduate school, and other decisions he should be considering include when he will quit his current job, or whether he could get a graduate degree using online courses. Collectively, these inputs comprise the elements of decision quality for this particular decision.

The first step of a method according to one aspect of the present invention may focus on providing the user with a good set of elements of decision quality for his post. The method may provide mechanisms for numerous levels of privacy where the posts can be made either (i) public to the world (all users) with the user's name, (ii) public to the world (all users) but anonymously without the user's name revealed, (iii) private to select friends of the user, or (iv) posted only to the user himself. The following inputs may then be provided by the site:

Inputs from the user: the user is asked to provide their own elements of decision quality.

Inputs from the social network: the social network is notified that the user requests their help and they are invited to provide elements of decision quality.

Inputs from historic posts: The user is offered a button called "Similar Posts" where related decisions, polls, and stories posted by others are made available. Chances are that someone has already faced a similar decision and, if it was made public, the user will get access to their elements of decision quality.

Inputs from decision-focused web-crawler: The present method may introduce the concept of a decision focused web crawler that brings results tailored to the elements of decision quality. The decision-focused web crawler may be different from existing search engines in that it provides categorized search for elements of the decision, instead of merely keyword matching. The decision-focused web crawler may search specifically for elements of decision quality that are related to the decision. The search can be conducted in any forum such as the internet of the actual database of the site. To illustrate the decision-focused web-crawler, if a user posts a decision about buying a Rolex Watch, the decision-focused web crawler may add certain keywords before conducting the search. The crawler may add words such as "Preferences" or "Uncertainty" or "Pros" or "Cons" to the search to retrieve search results spanning aspects of decision quality. The decision-focused web crawler may categorize the results based on the elements of decision quality. Furthermore, the decision-focused web crawler may divide the search results based on focused searches starting with specific sites based on the category of the posted decision, as well as results obtained from general search on the internet or the database. A trade-off between search time and the ability to retrieve results in elements of decision quality may be conducted based on preferences of the user, so that the user can allow for more time for a populating a database of elements of decision quality with better information, or can allow for less information for a quicker decision analysis time. Finally, the decision-focused web-crawler may also search statistics to help with decision making either on the internet or by linking to specific sites and databases. For example, a person may ask whether they should fight a speeding ticket in a particular county, or to have medical surgery at a given hospital, or whether to marry a person. The crawler will automatically add words such as "statistics", "success rate", "divorce rate", and so forth, to search in order to return ratios of success (of a surgery, or a court to fight the case, or a divorce rate) vs. failure. This is achieved by linking the crawler to databases of court, government sites, and medical records. For example, divorce rates for a given age at marriage and given ethnicity will be retrieved. Rates are categorized based on demographic factors such as race, gender, age, and education level.

Personalized automated recommendations: Through the user's history on the site (such as previous decisions analyzed or recommendations made to other users and through the individual's personality type (such as Myer's Briggs personality type)), the invention also mines the database and automatically populates some of the elements of decision quality for the user. Different users may receive different elements. For example, suppose a user had already analyzed an investment decision about investing in stocks or future contracts or putting the money in the bank. Depending on the probability distribution the user used, and the choice made, the method according to one aspect of the present invention may infer bounds on the user's risk profile. Different users will have different bounds on their risk profile based on their choices, and so different users will be presented with different automated investment recommendations by the invention for their posted decision. The method according to one aspect of the present invention may infer the risk aversion by observing prior choices using the notion of maximum entropy utility and by regression based on what individuals with similar risk aversion preferred in past decisions.

The method according to one aspect of the present invention then may incorporate elements of a decision obtained from the user, the social network, historic posts, and the decision-focused web crawler, and provides algorithms for incorporating them to determine: (i) the appropriate frame (the initial decision: including other decisions that are either taken as given or that need to be made before and after that initial decision) and (ii) the best decision using an expected utility framework when uncertainty is present or using a value function when there is no uncertainty. Furthermore, the method according to one aspect of the present invention may also provide simple graphical means to input likelihood and utility using displays including but not limited to a probability wheel or a sliding bar and a proprietary algorithm that minimizes cognitive biases and facilitates the elicitation process for the general public.

Figure 3:
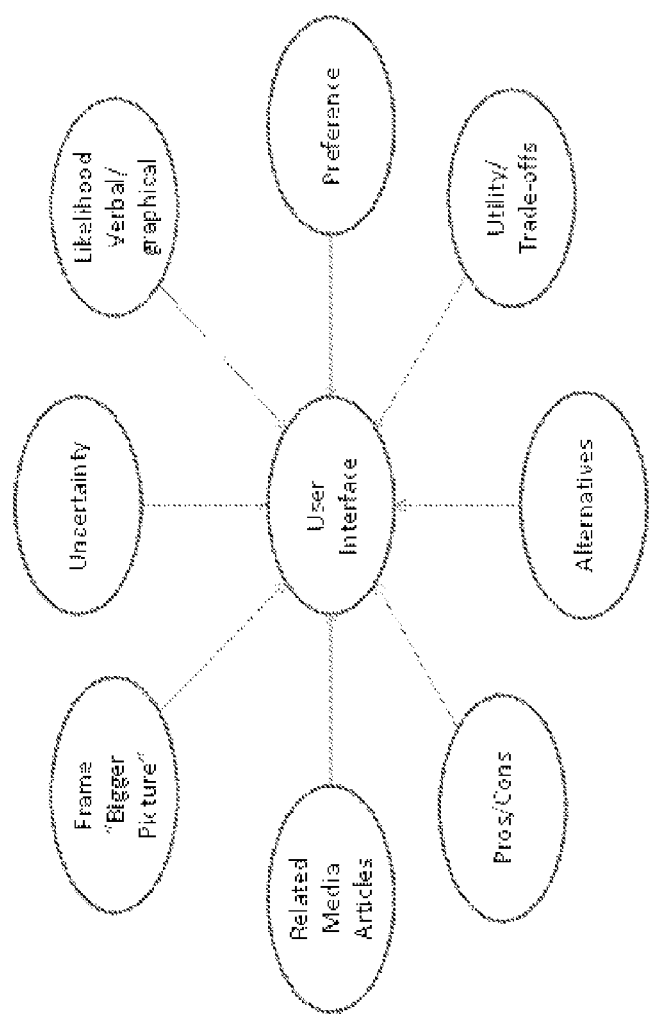
FIG. 3 shows inputs from a social network into a decision process, which may be stored for future decisions, according to one embodiment of the present invention.

Referring now to FIG. 3, an embodiment of the present invention is shown where the elements of decision quality are solicited (or retrieved from historic posts) in addition to information about the likelihood of a certain event. For example, a user may post requesting input about the likelihood that the stock market will go up in a week. This information can be assessed using probabilities, or likelihood values, or it can be assessed using verbal expressions such as "it is likely", or "unlikely" that the stock market will go up in a week. It can also be assessed by graphical methods such as a sliding bar indicating the likelihood, or using a probability wheel or using a poll.

FIG. 3 also shows an embodiment where trade-offs are assessed from the social network. For example, suppose a user posts a decision about a medical situation that involves quality of life and money. The user may solicit inputs from the social network about their personal trade-offs between these two attributes. The invention also provides a forum where a histogram of historic beliefs and trade-offs solicited is made available to the user to help him with the probability and trade-off assignment. For example, a histogram showing the trade-offs between extra salary and decreased vacation as assessed by several people is presented. The method according to one aspect of the present invention also may search historic posts to determine related posts to the one under consideration and categorizes the elements of decision quality for the user from the historic posts. Such historic posts may include (but are not limited to) previous decisions posted by other users about decisions they were facing at the time and the inputs they have received, previous polls posted by other users or posted by the user himself, stories posted by other users about decisions they had faced in the past, as well as thoughts posted by other users. Inputs from the decision-focused web crawler may also be obtained and categorized.

The inputs may be collected and organized in a format that is easy to use in decision framing and decision analysis. The method according to one aspect of the present invention also may provide a mechanism for automatically extracting categories of decision quality from the user's post. In case of text posts, algorithms are provided for automatically extracting and categorizing the elements of decision quality from the input text. In case of audio or video inputs, similar algorithms extract the elements of a decision and categorize them for facilitated decision making.

Figure 4:
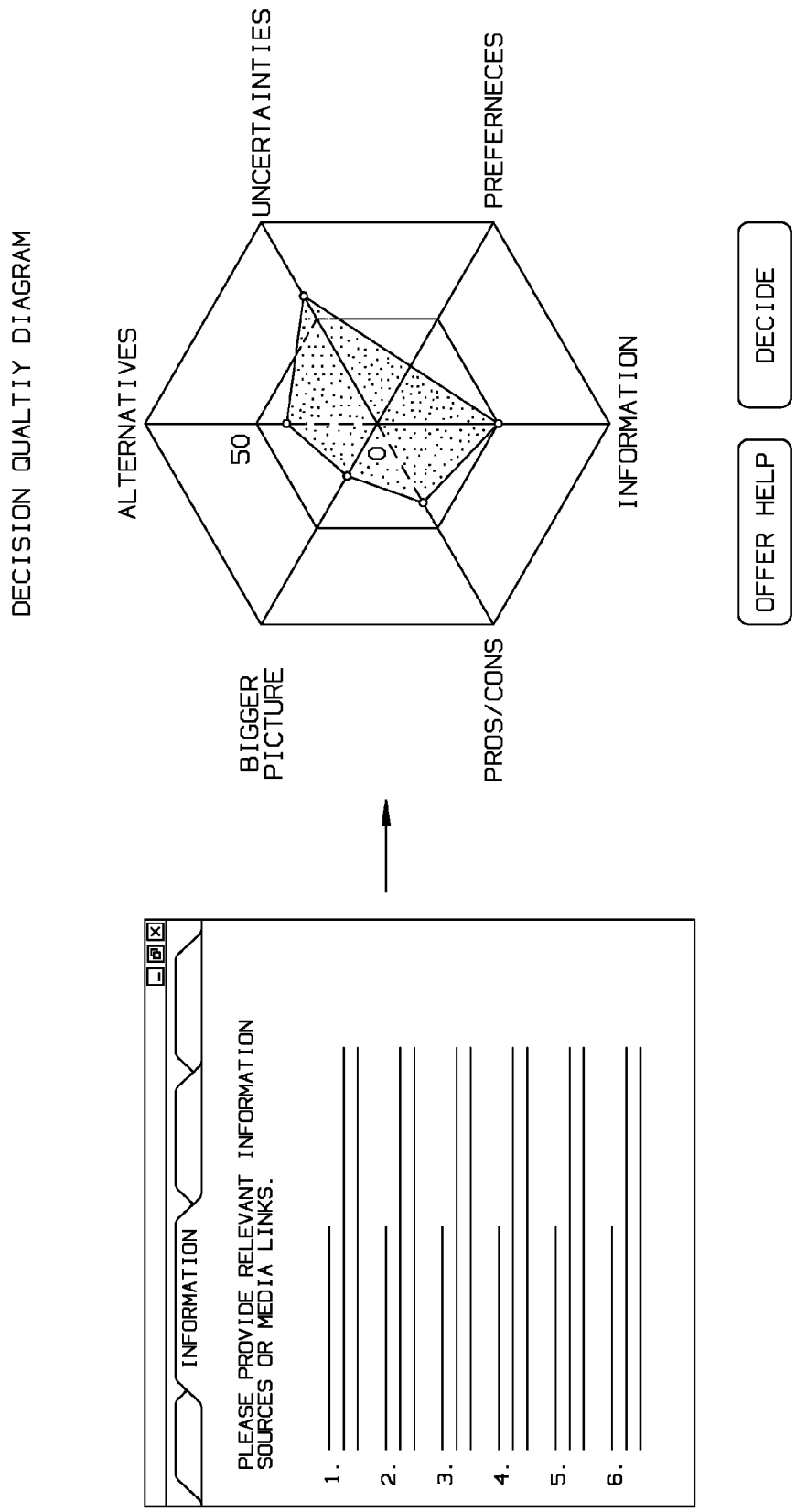
FIG. 4 shows a concept of a decision-focused web-crawler, which may search for elements of decision quality on the internet or on the server of a website and return related articles or posts through categorized entries, according to one embodiment of the present invention.

Referring now to FIG. 4, an embodiment of the present invention is shown where the elements of decision quality are obtained from the decision-focused web crawler. Unlike traditional search engines that rely on mere keyword matching, the decision-focused web-crawler may search specifically for elements of the decision that are related to the decision post. The decision focused crawler inserts additional words, such as Pros/Cons/Objectives/Trade-offs/Uncertainty/Bigger Picture/Frame/Alternatives (and so forth) in the search to match the elements of decision quality. The decision-focused web crawler then may return search results through categorized entries.

The decision focused web crawler may have several modes of operation using focused starting points for a given decision category or using general search as starting point. A trade-off between search time and the ability to retrieve results in the elements of decision quality may be conducted based on preferences of the user. A measure for quantifying the elements of decision quality received from the crawler and the social network may also be presented. The measure uses inputs that depend on the particular category of the decision, the importance of the decision, as well as the number of inputs received. For example, a decision about which undergraduate major to choose may require retrieving 30 alternatives to achieve 100% on the alternative score of the decision quality, while a decision about where to go for dinner may require only 10 alternatives to achieve 100% score on the alternatives portion of the elements of decision quality.

Figure 5:
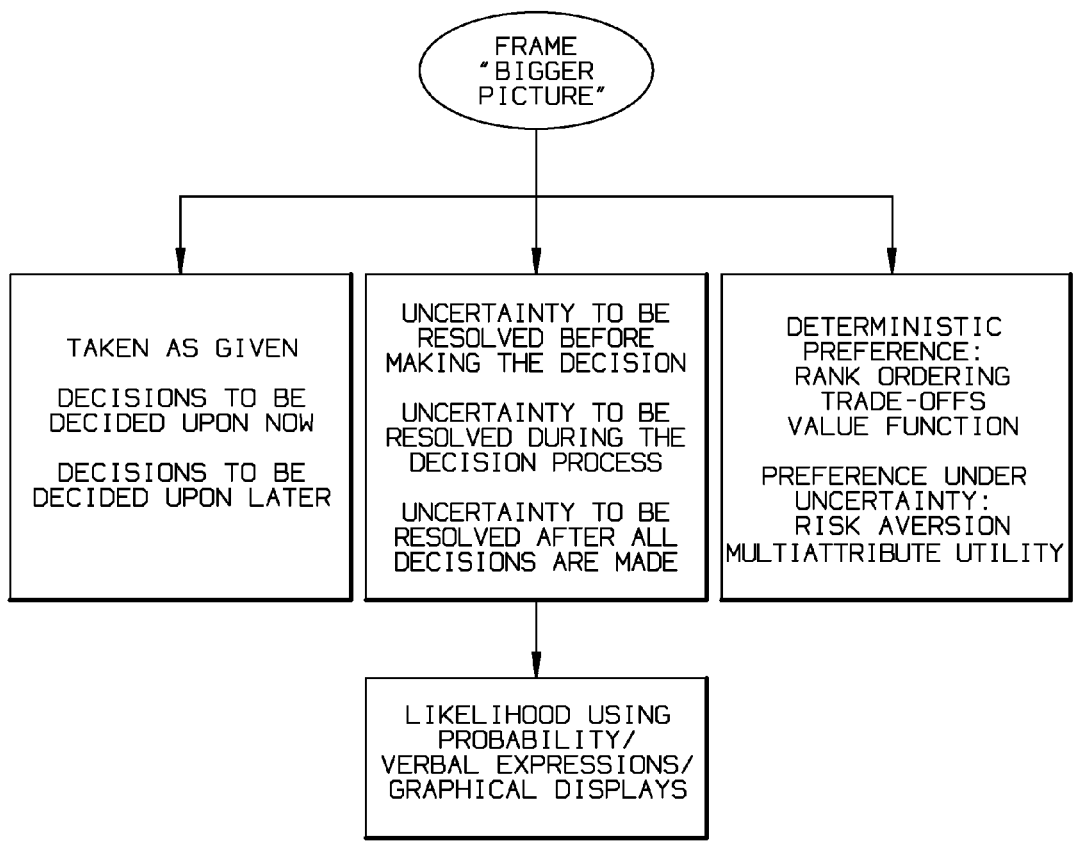
FIG. 5 shows a flowchart illustrating a decision framing and bigger picture inputs using a social network, historic posts, a user, and decision-focused web crawler, according to one embodiment of the present invention.

The method according to one aspect of the present invention also may provide a means for framing a decision using inputs from the social network, the historic posts, the user, and the decision-focused web crawler. Referring now to FIG. 5, a flowchart is shown that illustrates the framing procedure. The frame may solicit inputs to the following questions: decisions that are taken as given, the decisions to be decided later, and additional decisions that need to be considered within this analysis. The algorithm also may determine any uncertainties that could be resolved before the decision is made, or during the decision, or following the decision to help with value of information recommendations and calculations, as well as constructing the decision tree analysis from English text.

To illustrate, if a decision is posted about graduate school and there is an uncertainty about the social life in a particular school, the Bigger Picture phase may identify this uncertainty as one where information could be pursued before making the decision. The user may be referred to several articles about quality of life at a particular school or may be advised to get in touch with other students in numerous student organizations at that institute. If the uncertainty cannot be resolved, then it may appear as an uncertainty during the decision tree analysis. If it can be resolved before making the decision, then it is no longer an uncertainty that will affect the analysis. Finally, the framing phase provides mechanisms for determining the type of analysis to be used when there is uncertainty or when there is no uncertainty present.

Figure 6:
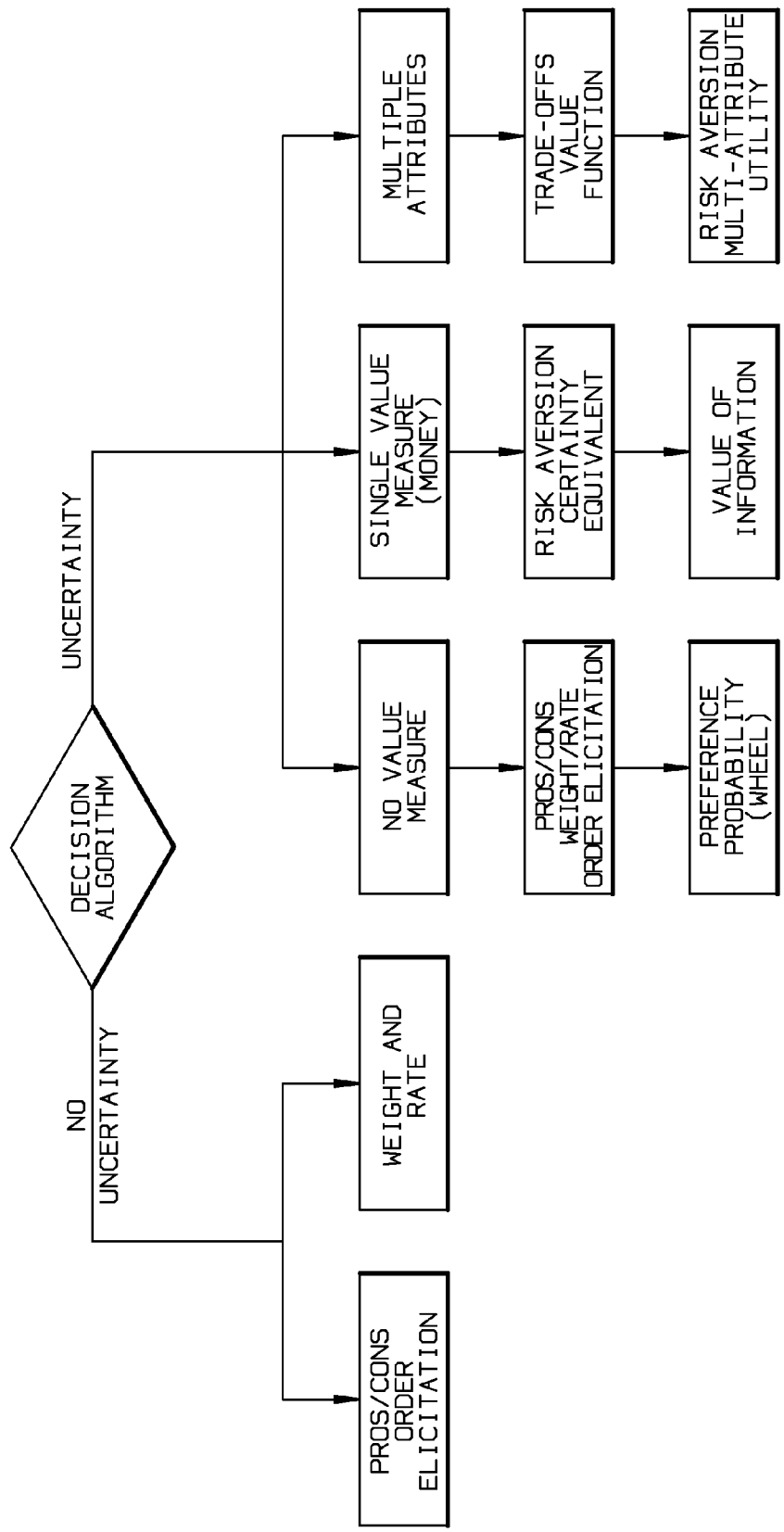
FIG. 6 shows a flowchart depicting a decision making algorithm according to one embodiment of the present invention.

The method according to one aspect of the present invention may further provide algorithms for determining the best decision (or decisions) based on the inputs from the user, the social network, the historic posts, and the decision-focused web crawler. Referring now to FIG. 6, the basic decision making approach is illustrated. The algorithm may distinguish decisions where there is uncertainty about the outcomes and those where there is no uncertainty (or uncertainty that can be resolved before the decision is made). For decisions where there is no uncertainty, the algorithm may determine preferential ordering of the consequences using numerous methods including any subset of: (i) direct ordinal preference elicitation for the consequences, (ii) pros/cons, (iii) weight and rate analysis, and (iv) value function determination to characterize the trade-offs for multiple attributes.

To illustrate how the method according to one aspect of the present invention carries out the pros/cons algorithm, consider a decision about whether a graduate student should do a summer internship or conduct research during the summer. Pros/Cons analysis would identify the pros and cons associated with each alternative through the user/social network/web-crawler/historic posts. Suppose the following pros are received for the summer internship: more money, more exposure to real world problems, and networking. There may be two cons for the summer internship: not publishing during the summer, longer time to graduate. Next the user may be asked to sort the pros and cons of each alternative from most important to least important. The user may sort pros in the order: more exposure to real world problems, more money, and networking. He may also sort the cons as longer time to graduate, not publishing during the summer. Then the user may be asked to interlace the list of pros and cons. For example, the interlaced list might be: more exposure to real world problems, more money, not publishing during the summer, longer time to graduate, networking.

The algorithm may then identify situations where either pros dominate cons or cons dominate pros in the interlaced list. For example, if every pro has a con below it, then pros dominate cons (and vice versa). An example of this is the list: more exposure to real world problems, more money, not publishing during the summer, longer time to graduate, networking. In this list, each of the first two pros has a separate con below it, and there are no remaining cons. There is a third pro. Therefore pros dominate cons in this example. When dominance does not exist, the user may be asked to assign an importance level for each pro and con. The score may then be added to determine whether or not pros outweigh the cons. For example, the interlaced list may be: more exposure to real world problems, not publishing during the summer, longer time to graduate, more money, networking will require an importance score since it is not the case that all pros (or cons) have cons (or pros) below them.

The method according to one aspect of the present invention may also carry out the weight and rate algorithm as follows. First it may solicit the important objects of the decision (from user/social network/internet/historic posts) and then ask the user to assign a preference score for each objective. Each alternative may be given an achievement score for each objective and an overall score is assigned to each alternative. For example, in a decision about which house to buy, the preferences might be size of house, cost, commute time to work, and view. The user may assign a weight for each preference. The assignment can also be made graphically using a stars count instead of number for ease of use. For example, size of house can get 5 stars, cost can get 4.5 stars, commute time 3 stars, and view 2 stars. The method according to one aspect of the present invention may also show the user a histogram of preference weights provided by other users or results of polls conducted to illustrate the weights users have posted in this decision. For each house under consideration, the user may then be asked to provide an achievement score. For example House A might have a large size, but costs more, and involves more commute time, and has a better view than House B. Therefore, it will get a larger achievement score on size, and view but a lower achievement score on cost and commute time. A weighted sum of the preference weights and achievement score may be calculated for each house and the house with the highest score is preferred.

The method according to one aspect of the present invention also allows for situations where the scoring function is non-linear and cannot be represented by a weighted sum of weights and achievement scores. In this case, a more general value function may be constructed using numerous methods such as direct assessment of trade-offs among the preference attributes of the decision.

For decisions where uncertainty is present, the algorithm may further distinguish situations where a value measure is used (such as money) and those where no value measure is used in the analysis. This added flexibility tailors the invention to the population level where general decisions can be analyzed and decided upon without necessarily using a monetary value measure. When no value measure is used, the algorithm may first conduct deterministic ordinal preference ranking using any subset of: (i) direct ordinal preference elicitation for the consequences, (ii) pros/cons, (iii) weight and rate analysis, and (iv) value function determination. The algorithm may then conduct an indifference probability assessment for each outcome in terms of the best and worst outcomes. The best decision alternative may be the one with the highest expected indifference probability.

If a value measure is used in the analysis, such as money, the algorithm may determine the risk attitude over value to construct a utility function that incorporates risk aversion and conducts certainty equivalent and value of information calculations. To provide further flexibility, the algorithm may also enable indifference probability assessments for discrete consequences, even if a value measure is provided, when the user is more comfortable with indifference assessments.

When multiple attributes are present, the algorithm may assess trade-offs among the attributes using a value measure and assesses a utility function over value or derive the multi-attribute utility function directly using qualitative properties from the decision maker and utility assessments over the attributes. The best decision may be the one with the highest expected utility.

If the decision maker does not provide the complete set of required utility, trade-offs, and likelihood values the method according to one aspect of the present invention may incorporate methods such as maximum entropy utility, maximum likelihood, and the user's history to fill in the remaining values.

Figure 7:
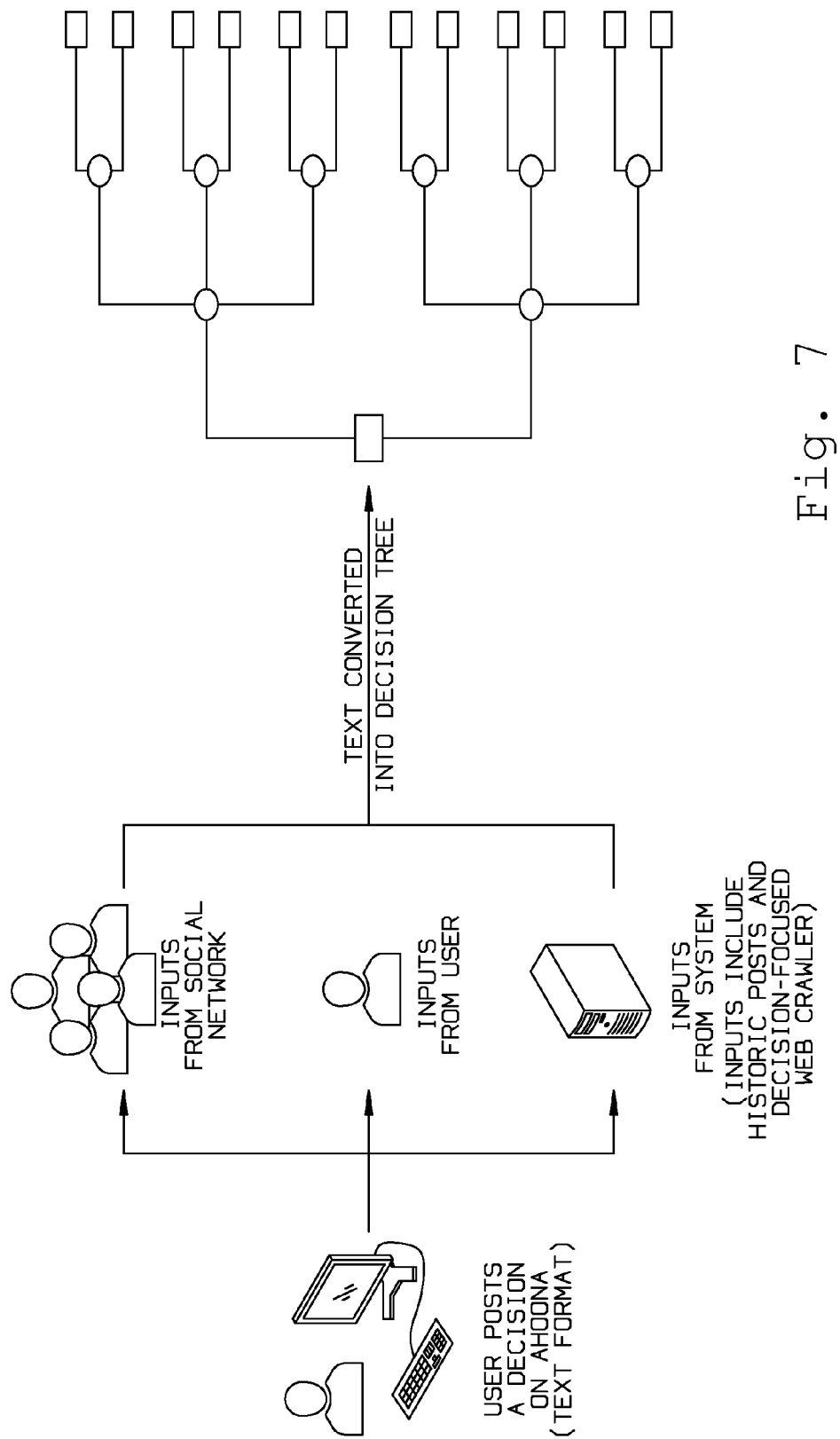
FIG. 7 depicts an algorithm for converting text into a decision tree according to one embodiment of the present invention.

The method according to one aspect of the present invention also may provide decision tree analysis and provide a mechanism for constructing a decision tree using text and verbal statements to facilitate the analysis for the general public. For example, the user may first be asked about the decisions they are facing and the number of alternatives for each decision. The user may be provided by inputs received from the social network, web-crawler, and historic posts to facilitate with this task. The user may be asked to sort the decisions in chronological order of when they will be made. The user may also be asked about the uncertainties in the decision, and to specify those uncertainties that can be resolved before each decision, during the decision, and after each decision is made. Once again, the user may be presented with inputs received from the network and the historic posts to help with this task. The user may also be asked about situations where there is asymmetry among the alternatives (some uncertainties may appear in some alternatives and not in others). The user may then be presented with an automatically drawn decision tree that preserves the chronological order provided and any asymmetries present. The user may be given the option to modify any particular order in the decision tree or to add/delete any of its elements. Referring now to FIG. 7, the concept of converting text questions and answers into the graphical representation of the decision tree is illustrated.

Another embodiment of the present invention allows a user to store and share a decision analysis with users on the social network whereby the user can conduct a decision analysis, share it with users and then receive inputs/edits/suggestions on the various aspects of the analysis including the uncertainties, weights, preferences, probabilities, and likelihoods. A further embodiment of the present invention may allow users to follow: (i) other users to keep track of their actions on the system, or (ii) other posts to keep track of the inputs received.

Another embodiment of the present invention allows users access to historic inputs obtained from prior posts. Such inputs can be in the form of prior decisions people were facing at the time, posted stories people posted about past decisions, polls, and thoughts posted by other people. The method according to one aspect of the present invention may provide numerous methods for enabling access to historic posts including: (i) similar posts button on the user post (this button searches numerous related posts on the database based on the actual post made by the user), (ii) a search bar whereby users can search historic posts or businesses and retrieve elements of decision quality, or even search for other users using keywords or characters, (iii) scrolls or bulletin boards whereby users can access public posts or posts that were private but addressed to them, (iv) historic inputs of decision quality made available during each phase of the analysis.

Another embodiment of the present invention allows users to post a time limit by which they need to make a decision, and to nudge friends and followers if sufficient inputs from them have not been received.

Another embodiment of the present invention asks users upon expiration of the time needed to make their decision if they would like to extend the duration, or if they would like to share their decision with other users.

Another embodiment of the present invention asks users whose decisions have expired a certain time back, how they are feeling about the decision they have made and incorporates this feedback into future recommendations.

The method according to one aspect of the present invention can work in a variety of different formats. It does not need to be provided over the internet, but the internet provides a convenient forum for soliciting the inputs.

An embodiment of the present invention may include a feature where a user may opt to "Decide Fast" or "Decide Slow". Decide fast provides help for simple decisions where required analysis in not complicated and it can be done numerically. Decide slow requires more analysis. Proprietary algorithms take certain inputs to determine the process to be used for each decision method, fast or slow.

Another embodiment of the present invention includes a feature where "Like/dislikes" received will be used to compile "Historic Suggestions" for users making decisions so they have access to previous decisions that were made public. This approach combines features of learning from historic decisions as well as the benefits of a live social network.

Another embodiment of the present invention includes a feature where the user's geographic location is determined through the system and where the personalized recommendations and retrieval of historic posts are made based on the user's location.

A further embodiment of the present invention includes situations where the decisions can be posted into categories. The categories include but are not limited to: dating/relationships, dining/entertainment, housing, automobiles, purchases, travel/vacation, lifestyle, gym/sports/fitness, education, job/work/business, medical, legal, investment, auctions/bidding, family/marriage, politics and other/miscellaneous.

The above-discussed embodiments include software that performs certain tasks. The software discussed herein may include script, batch, or other executable files. The software may be stored on a machine-readable or computer-readable storage medium, and is otherwise available to direct the operation of the computer system as described herein and claimed below. In one embodiment, the software uses a local or database memory to implement the data transformation and data structures. The local or database memory used for storing firmware or hardware modules in accordance with an embodiment of the invention may also include a semiconductor-based memory, which may be permanently, or remotely coupled to a microprocessor system.

The computer-based data processing system described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention. The present invention includes a system for making a decision, comprising: a machine; and a program product comprising machine-readable program code for causing, when executed, the machine to perform any method as described herein.

It should be understood, of course, that the foregoing relates to exemplary embodiments of the invention and that modifications may be made without departing from the spirit and scope of the invention.

What is claimed is:

1. A method for making a decision using a decision tree, comprising:
   receiving a decision from a user;
   determining a set of alternatives of the decision;
   determine a set of uncertainties for each alternative of the decision;
   utilizing a web crawler configured to search social networks and the internet for documents relevant to the set of uncertainties of the alternatives;
   determine uncertainties that can be resolved by the documents;
   removing uncertainties that have been resolved by documents relevant to the set of uncertainties;
   determining a set of pros and cons for each alternative of the set of alternatives by the web crawler or the social network;
   determine dominance relations between each determined set of pros and cons;
   utilizing the web crawler to determine similar decisions on the social network by including key words from the alternatives, pros and cons, and uncertainties of the decision;
   utilizing the web crawler to retrieve statistics of key words from the alternatives, pros and cons, and uncertainties of the decision;
   display a histogram of other user preference weights provided by other users for the determined similar decisions;
   assign user preference weight values to each pro and con of the set of pros and cons;
   calculating a weighted sum of the user preference weights of the set of pros and cons for each decision;
   providing a decision recommendation for the decision question based on the weighted sum of the preference weights for each decision.

2. The method as claimed in claim 1, wherein the webcrawler is configured to search the internet and social network continuously until a minimum quantity of data has been collected.

3. The method as claimed in claim 1, wherein the social network comprises a public social network.

4. The method as claimed in claim 1, wherein the social network comprises a private social network private to the first user.

5. The method as claimed in claim 1 further comprising, determining an inference about the user based at least in part on a geographic location of the user.

6. The method as claimed in claim 1, further comprising producing a decision tree based at least in part on the data related to the set of alternatives.

7. The method as claimed in claim 1, further comprising providing the user quantitative feedback regarding the decision.

8. The method as claimed in claim 1, wherein a geographic location of the first user is used in the step of providing a decision recommendation.

* * * * *